US011422301B2

(12) United States Patent
Yamada et al.

(10) Patent No.: US 11,422,301 B2
(45) Date of Patent: Aug. 23, 2022

(54) OPTICAL FIBER CABLE

(71) Applicant: NIPPON TELEGRAPH AND TELEPHONE CORPORATION, Tokyo (JP)

(72) Inventors: Yusuke Yamada, Tsukuba (JP); Masashi Kikuchi, Tsukuba (JP); Hisashi Izumita, Tsukuba (JP); Junichi Kawataka, Tsukuba (JP); Kazunori Katayama, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/254,501

(22) PCT Filed: Jun. 20, 2019

(86) PCT No.: PCT/JP2019/024569
§ 371 (c)(1),
(2) Date: Dec. 21, 2020

(87) PCT Pub. No.: WO2020/004230
PCT Pub. Date: Jan. 2, 2020

(65) Prior Publication Data
US 2021/0124113 A1    Apr. 29, 2021

(30) Foreign Application Priority Data
Jun. 25, 2018    (JP) .............................. JP2018-120005

(51) Int. Cl.
*G02B 6/036*    (2006.01)
*G02B 6/44*    (2006.01)

(52) U.S. Cl.
CPC ............. *G02B 6/036* (2013.01); *G02B 6/443* (2013.01)

(58) Field of Classification Search
CPC .............................. G02B 6/036; G02B 6/4289
See application file for complete search history.

(56) References Cited

U.S. PATENT DOCUMENTS 3,969,016 A * 7/1976 Kaiser .................. G02B 6/4403
                                                    385/128
4,589,404 A * 5/1986 Barath ................... A61B 1/042
                                                    348/359
(Continued)

FOREIGN PATENT DOCUMENTS

| CN | 104321673 A | 1/2015 |
| JP | H08313770 A | 11/1996 |

(Continued)

OTHER PUBLICATIONS

Yamada et al., "Development of Novel Optical Fiber Ribbon Assembled into Extremely High-Density Optical Fiber Cable", IEICE Technical Report OFT2013-6 (May 2013).
(Continued)

*Primary Examiner* — Charlie Y Peng
(74) *Attorney, Agent, or Firm* — Harness, Dickey & Pierce, P.L.C.

(57) ABSTRACT

An optical fiber cable 100 includes at least one optical fiber core 140 and a sheath containing the optical fiber core. The optical fiber core 140 includes optical fibers 130. A total length of the optical fiber core 140 is longer than that of the sheath 160. The optical fiber core 140 is contained in the sheath 160 so that bending occurs in the optical fibers 130.

8 Claims, 7 Drawing Sheets

(56) References Cited

U.S. PATENT DOCUMENTS

| | | | |
|---|---|---|---|
| 5,163,116 A | 11/1992 | Oestreich et al. | |
| 7,382,955 B1 * | 6/2008 | Keller | G02B 6/441 |
| | | | 385/100 |
| 9,405,060 B2 * | 8/2016 | Ishida | G02B 6/02042 |
| 2013/0301998 A1 * | 11/2013 | Hayashi | G02B 6/02042 |
| | | | 385/100 |
| 2016/0313175 A1 * | 10/2016 | Debban | G02B 6/443 |

FOREIGN PATENT DOCUMENTS

| | | |
|---|---|---|
| JP | 9-26534 A | 1/1997 |
| JP | 2011169939 A | 9/2011 |
| JP | 2013186286 A | 9/2013 |
| JP | 2016218375 A | 12/2016 |
| JP | 2017009629 A | 1/2017 |
| JP | 201772818 A | 4/2017 |
| JP | 2017151343 A | 8/2017 |
| JP | 201836339 A | 3/2018 |
| WO | WO-9100536 A1 | 1/1991 |

OTHER PUBLICATIONS

Sakamoto et al., "Realization of Optical Fiber Having the Highest Density in the World with Reliability Sufficient for Practical Use", NTT Technical Journal, Nov. 2013.

T. Sakamoto et al., "Fibre Twisting and Bending Induced Mode Conversion Characteristics in Coupled Multi-core Fibre" Ecoc 2015-ID: 0087.

International Search Report (English and Japanese) issued in PCT/JP2019/024569, dated Sep. 10, 2019.

* cited by examiner

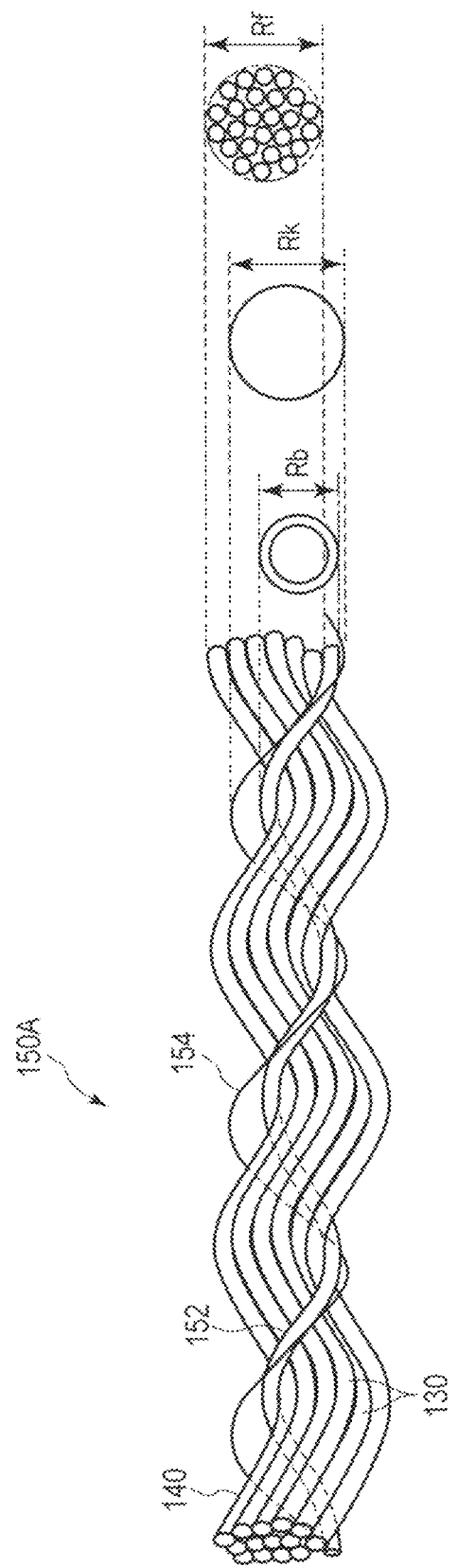
F I G. 5

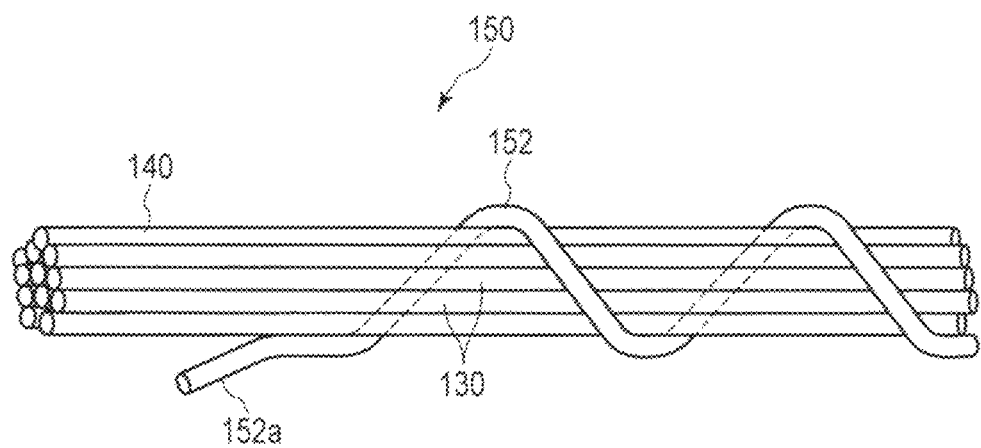
F I G. 6
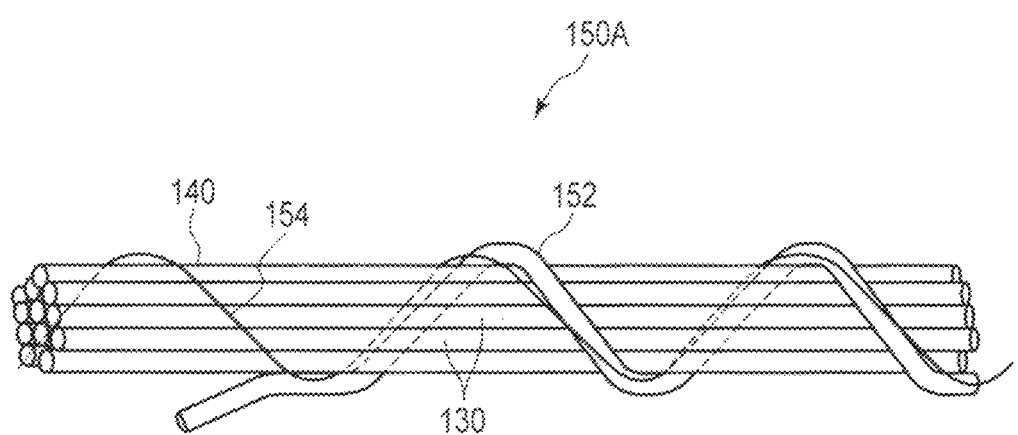
F I G. 7

OPTICAL FIBER CABLE

CROSS-REFERENCE TO RELATED APPLICATIONS

This is a U.S. national phase application under 35 USC 371 of international application PCT/JP2019/024569, filed on Jun. 20, 2019, which claims priority to Japanese patent application No. 2018-120005, filed on Jun. 25, 2018. The entire disclosures of the above applications are incorporated herein by reference.

FIELD

The present invention relates generally to an optical fiber cable, which is, for example, a component of information wiring utilizing optical fibers outdoors and indoors.

BACKGROUND

Optical fiber cables are used as a transmission medium for communication signals. For effective use of space for laying such optical fiber cables, small-diameter, high-density optical fiber cables formed by bundling optical fibers in an extremely dense manner have been proposed and put into practical use (for example, Non-Patent Literature 1). In this manner, optical fiber cables have been provided with enhanced spatial multiplicity to establish efficient media networks.

In recent years, for further enhancement of spatial multiplicity, a multi-core optical fiber, which has a plurality of cores and is capable of propagating a plurality of optical signals through a single optical fiber, and a several-mode optical fiber, which transmits optical signals in a plurality of modes, have been proposed to increase the transmission capacity per optical fiber as much as possible (for example, Non-Patent Literature 2). In the several-mode optical fiber, optical signals propagating in respective modes are coupled. In the multi-core optical fiber in which spatial multiplicity is increased, optical signals propagating through respective cores (the optical signals propagating through the respective cores are regarded as signals of respective modes) are coupled. The influence of such inter-mode coupling between the optical signals can be compensated for by performing signal processing at a receiving end at the time of transmission. However, it is known that the load of the signal processing at the receiving end becomes large as the difference in group velocity (propagation time per unit time) between modes (Differential Mode Delay; hereinafter referred to as "DMD") becomes large (for example, Non-Patent Literature 2).

As one means for reducing the DMD, providing a sufficient inter-mode coupling has been proposed, and this has been achieved by designing a refractive index distribution of the optical fiber or by applying a twist to the optical fiber (for example, Patent Literatures 1 and 2).

CITATION LIST

Patent Literature

[Patent Literature 1] Jpn. Pat. Appln. KOKAI Publication No. 2016-218375
[Patent Literature 2] Jpn. Pat. Appln. KOKAI Publication No. 2017-009629
[Patent Literature 3] Jpn. Pat. Appln. KOKAI Publication No. 2017-151343

Non-Patent Literature

[Non-Patent Literature 1] Yamada et al., "Development of Novel Optical Fiber Ribbon Assembled into Extremely High-Density Optical Fiber Cable", IEICE Technical Report OFT2013-6 (2013-5)
[Non-Patent Literature 2] Sakamoto et al., "Realization of Optical Fiber Having the Highest Density in the World with Reliability Sufficient for Practical Use", NTT Technical Journal, 2013.11
[Non-Patent Literature 3] T. Sakamoto et al., "Fibre Twisting and Bending Induced Mode Conversion Characteristics in Coupled Multi-core Fibre" Ecoc 2015-ID: 0087

SUMMARY

Technical Problem

It is known, however, that the characteristics of the inter-mode coupling are affected by bending of the optical fiber (Non-Patent Literature 3). Further, when an optical fiber is installed in an optical fiber cable, bending is applied to the optical fiber (for example, Non-Patent Literature 1). Thus, when an optical fiber is supposed to be used as a transmission path, it is important to control the coupling characteristics in consideration of the bending to be applied to the optical fiber in a state where it is installed in the optical fiber cable. Patent Literature 3 proposes a method for controlling the coupling characteristics by appropriately designing the shape of a slot in a slotted rod type optical fiber cable including a slot for containing an optical fiber core. However, if an optical fiber cable uses such a slotted rod, the spatial multiplicity of the optical fiber cable lowers.

The present invention aims to provide an optical fiber cable that achieves both improvement in spatial multiplicity and securing of coupling characteristics.

Solution to Problem

An optical fiber cable according to the present invention includes at least one optical fiber core including a plurality of optical fibers, and a sheath containing the optical fiber core. A total length of the optical fiber core is longer than that of the sheath. The optical fiber core is contained in the sheath so that bending occurs in the optical fibers.

Advantageous Effects of Invention

According to the present invention, the optical fiber core longer than the sheath is contained in the sheath, so that the optical fiber core meanders in the internal space of the sheath. As a result, bending occurs in each of the optical fibers of the optical fiber core. The bending in each optical fiber varies depending on the balance between the total length of the optical fiber core and the total length of the sheath. Therefore, bending can be applied to each optical fiber of the optical fiber core so as to achieve both improvement in spatial multiplicity and securing of coupling characteristics.

BRIEF DESCRIPTION OF THE DRAWINGS

FIG. 5 is a schematic view of a unit for explaining a fourth embodiment of the present invention.

FIG. 6 is a schematic view of the unit according to the second embodiment in which a bundle member is cut and an optical fiber core becomes linear.

FIG. 7 is a schematic view of the unit according to the fourth embodiment in which a bundle member is cut and an optical fiber core becomes linear.

DESCRIPTION OF EMBODIMENTS

Hereinafter, embodiments of the present invention will be described with reference to the accompanying drawings.

First Embodiment

Figure 1:
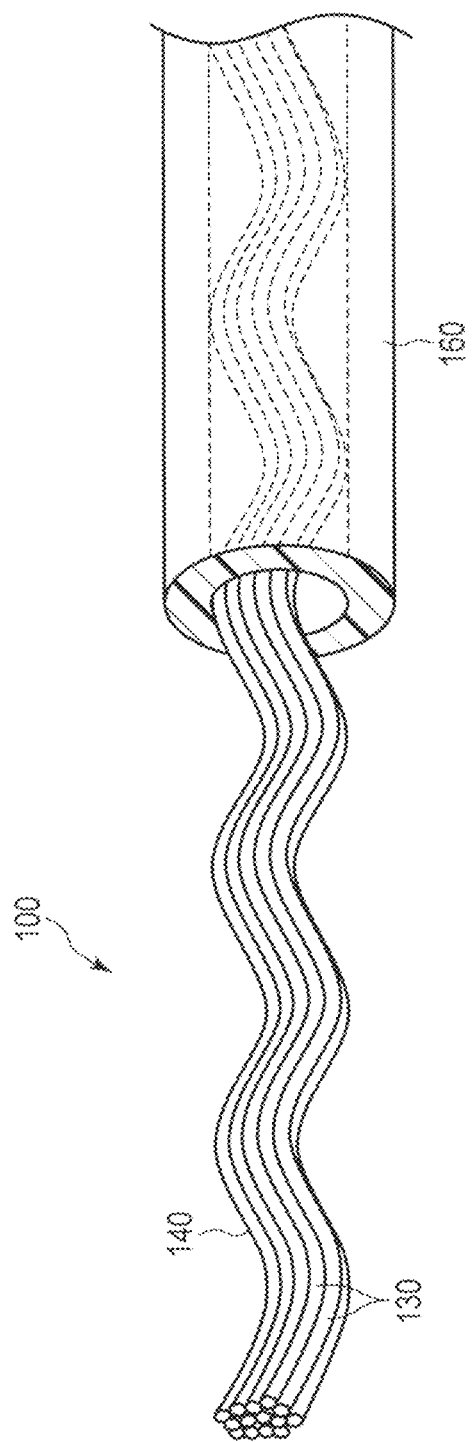
FIG. 1 is a schematic view of an optical fiber cable for explaining a first embodiment of the present invention.

FIG. 1 is a schematic view of an optical fiber cable for explaining a first embodiment of the present invention.

An optical fiber cable 100 includes a single optical fiber core 140 and a sheath 160 covering the optical fiber core 140. The sheath 160 serves to protect the optical fiber core 140. In FIG. 1, the illustration of the sheath 160 is partially omitted for easy viewing of the optical fiber core 140.

The optical fiber core 140 comprises a plurality of single-core optical fibers or at least one multi-core optical fiber. The single-core optical fiber may be, for example, a jacketed optical fiber with a jacket provided around the outer periphery of the optical fiber. The multi-core optical fiber may be, for example, an optical fiber ribbon formed by integrating a plurality of jacketed optical fibers, or an intermittently bonded optical fiber ribbon formed by intermittently bonding a plurality of jacketed optical fibers with respect to the longitudinal direction. The optical fiber core 140 includes a plurality of optical fibers 130, regardless of whether it comprises a plurality of single-core optical fibers or it comprises at least one multi-core optical fiber.

The total length of the optical fiber core 140 is longer than that of the sheath 160, and the optical fiber core 140 is contained in the internal space of the sheath 160 so that bending occurs in the optical fibers 130. For example, bending in the optical fiber core 140 occurs at every portion of the entire length of the optical fiber cable 100. In other words, continuous bending occurs in the optical fiber core 140.

The optical fiber core 140 longer than the sheath 160 is contained in the sheath 160, so that the optical fiber core 140 meanders in the internal space of the sheath 160 and deforms into a spiral shape, for example. As a result, bending occurs in each of the optical fibers 130 of the optical fiber core 140.

The bending in each optical fiber 130 varies depending on the balance between the total length of the optical fiber core 140 and the total length of the sheath 160.

Therefore, according to the present embodiment, bending can be applied to each optical fiber 130 of the optical fiber core 140 so as to achieve both improvement in spatial multiplicity and securing of coupling characteristics.

Second Embodiment

Figure 2:
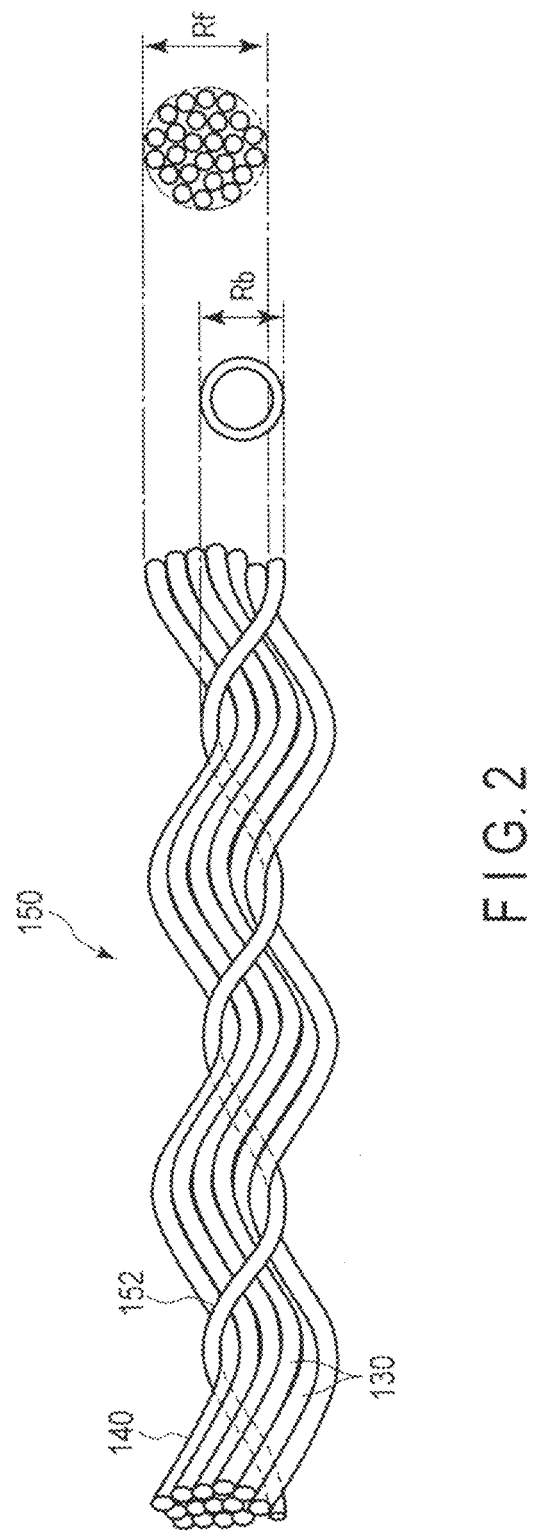
FIG. 2 is a schematic view of a core unit for explaining a second embodiment of the present invention.

FIG. 2 is a schematic view for explaining a second embodiment of the present invention. The present embodiment relates to a core unit 150 that can substitute for the optical fiber core 140 shown in FIG. 1. FIG. 2 shows the appearance structure of the core unit 150 on the left side, and shows the cross-sectional structure of the core unit 150 on the left side. In FIG. 2, the members denoted by the same reference numerals as used in FIG. 1 are members similar to those of FIG. 1, and a detailed description of such members will be omitted.

As can be seen from the appearance structure shown on the left side of FIG. 2, the core unit 150 includes an optical fiber core 140 and a bundle member 152, which is spirally wound around the outer periphery of the optical fiber core 140. Although the core unit 150 is illustrated as having a single bundle member 152 in FIG. 2, the core unit 150 is not limited thereto and may have a plurality of bundle members 152.

Further, as can be seen from the cross-sectional structure shown on the right side of FIG. 2, the optical fiber core 140 is bundled so as to have a substantially circular shape in a cross section orthogonal to the cable axis of the optical fiber cable 100. A spiral radius Rb of the bundle member 152 is smaller than a radius Rf of the substantially circumscribed circle of the optical fiber core 140.

The bundle member 152 is wound around the outer periphery of the optical fiber core 140 with a spiral radius Rb smaller than the radius Rf of the substantially circumscribed circle of the optical fiber core 140, so that the optical fiber core 140 is deformed into a spiral shape. That is, the bundle member 152 serves to deform the optical fiber core 140 into a spiral shape. With such a structure, bending can be applied to each optical fiber 130 of the optical fiber core 140.

The bending R applied to the optical fiber core 140 is expressed by the following equation:

$$R=Ru/\{Ru^2+(P/2\pi)^2\}$$

Here, P is a winding pitch of the bundle member 152. Ru is a spiral radius of the optical fiber core 140 caused by the winding of the bundle member 152. Ru is expressed by the following equation:

$$Ru=(Rf-Rb)/2$$

Thus, the bending applied to each optical fiber 130 of the optical fiber core 140 can be controlled by setting of the winding pitch of the bundle member 152 and the spiral radius of the optical fiber core 140.

According to the present embodiment, bending can be applied to each optical fiber 130 of the optical fiber core 140 so as to achieve both improvement in spatial multiplicity and securing of coupling characteristics. In addition, by the setting of the winding pitch of the bundle member 152 and the spiral radius of the optical fiber core 140, bending according to the coupling characteristics of the optical fibers 130 can be applied to the optical fibers 130.

If the bending radius R applied to the optical fibers 130 is too small, a break due to bending strain may be caused in the optical fibers 130. For this reason, the lower limit of the bending radius R is desirably set to a value at which no break due to bending strain occurs in the optical fibers 130. In general, it is desirable that the lower limit of the bending radius R be set, for example, to a value equal to or more than 15 mm.

Figure 3:
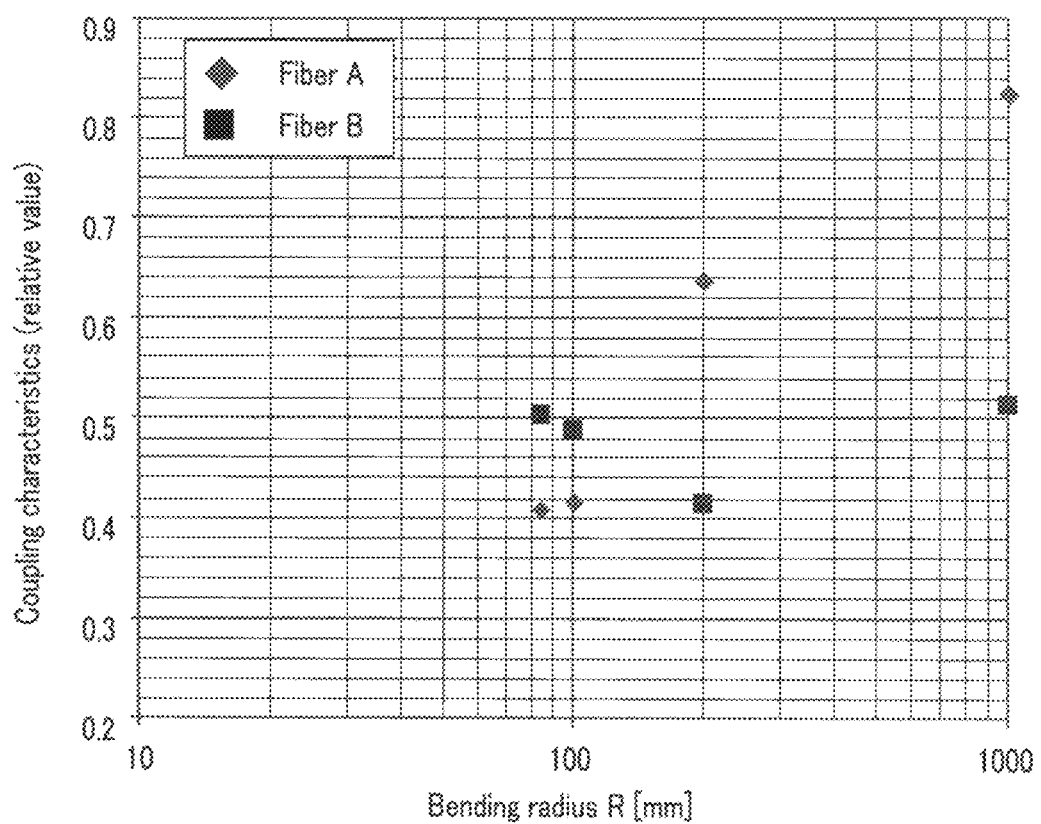
FIG. 3 is a graph showing measurement results of a relationship between the coupling characteristics and the bending radius of optical fibers.

On the one hand, the coupling characteristics depend on the bending radius R. The inventors of the present invention, therefore, measured the coupling characteristics while changing the bending radius R of the optical fibers 130 by changing the tension applied to the bundle member 152 with the winding pitch of the bundle member 152 set to 60 mm. FIG. 3 is a graph showing measurement results of a relationship between the coupling characteristics and the bending radius R of the optical fibers 130.

Here, fiber A is a coupled optical fiber having two cores, and is an example of a fiber in which the two cores are arranged to be close to each other. Fiber B is an example of a fiber in which two cores are arranged to be the furthest away from each other in a range in which light propagating through the two cores is coupled.

The following are expected from the measurement results shown in FIG. 3. The coupling characteristics of fiber A decrease with a decrease in the bending radius R, and take the minimum value when the bending radius R is 84 mm. Further, in a range in which the bending radius R is smaller than 84 mm, the coupling characteristics also decrease with a decrease in the bending radius R. On the other hand, the coupling characteristics of fiber B take the minimum value when the bending radius R is 200 mm. In a range in which the bending radius R is smaller than 200 mm, the coupling characteristics increase with a decrease in the bending radius R. In a range in which the bending radius R is greater than 200 mm, the coupling characteristics increase with an increase in the bending radius R. That is, when the bending radius R is equal to or more than 200 mm, no significant effect can be obtained.

In view of the aforementioned results, it is desirable that the value of the bending radius R of the optical fibers 130 in the optical fiber cable 100 be equal to or greater than a value at which no break due to bending strain occurs in the optical fibers 130, and also fall within a range in which the effect of promoting the coupling characteristics can be obtained. For example, the minimum value of the bending radius R is desirably 15 mm or more, and the maximum value of the bending radius R is desirably 200 mm or less.

Third Embodiment

Figure 4A:
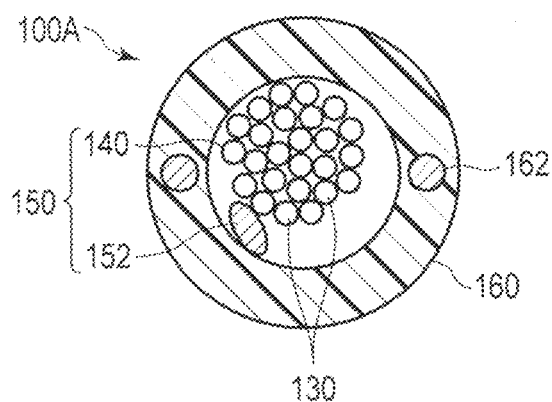
FIG. 4A is a schematic cross-sectional view of an optical fiber cable for explaining a third embodiment of the present invention.
Figure 4B:
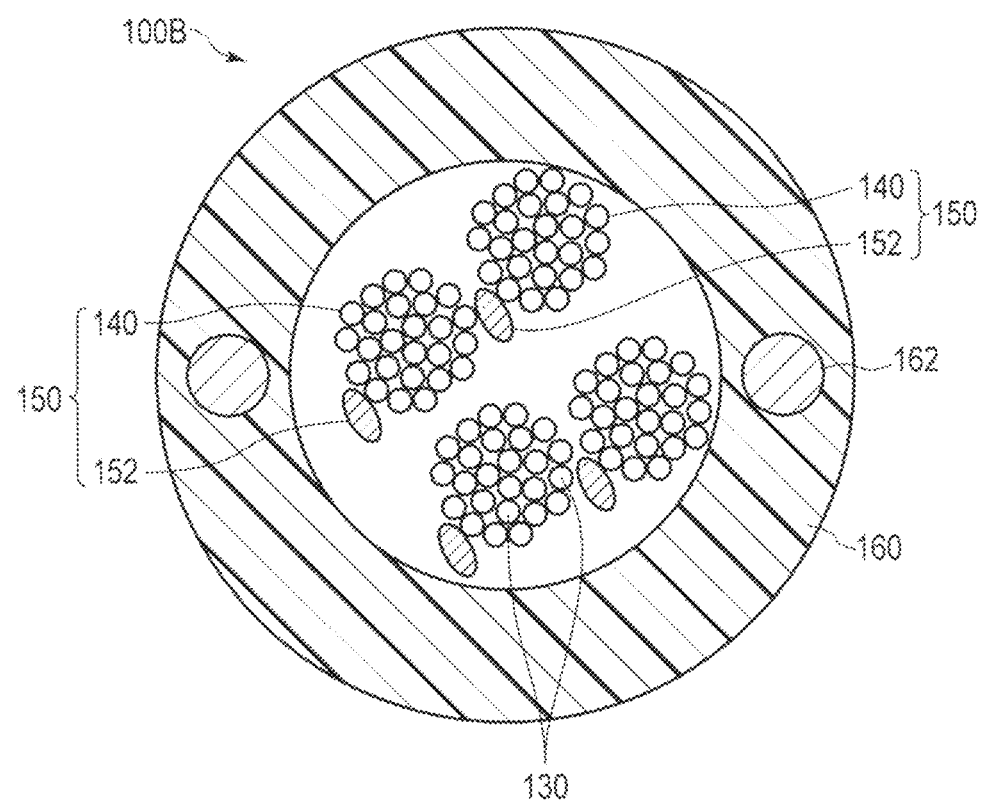
FIG. 4B is a schematic cross-sectional view of another optical fiber cable for explaining the third embodiment of the present invention.

FIGS. 4A and 4B are schematic views for explaining a third embodiment of the present invention. The present embodiment relates to a structure of the optical fiber cable 100. FIG. 4A is a schematic cross-sectional view of an optical fiber cable 100A according to the present embodiment. FIG. 4B is a schematic cross-sectional view of another optical fiber cable 100B according to the present embodiment. In FIGS. 4A and 4B, the members denoted by the same reference numerals as used in FIGS. 1 and 2 are members similar to those of FIGS. 1 and 2, and a detailed description of such members will be omitted.

As shown in FIG. 4A, the optical fiber cable 100A according to the present embodiment includes a single core unit 150 and a sheath 160 that contains the core unit 150. That is, the optical fiber cable 100A includes a single optical fiber core 140.

Further, as shown in FIG. 4B, the optical fiber cable 100B according to the present embodiment includes a plurality of core units 150 and a sheath 160 that contains the core units 150. That is, the optical fiber cable 100B includes a plurality of optical fiber cores 140. For example, the optical fiber cable 100B includes four core units 150. The number of core units 150 is not limited to four, and may be selected as appropriate.

In this manner, the optical fiber cable 100 may be either the optical fiber cable 100A having a single optical fiber core 140 or the optical fiber cable 100B having a plurality of optical fiber cores 140. That is, the optical fiber cable 100 only has to include at least one optical fiber core 140.

In the optical fiber cables 100A and 100B, the number of core units 150 contained in the internal space of the sheath 160 and the like are preferably determined according to the diameter of the internal space of the sheath 160. For example, the number of core units 150 is preferably selected so that the optical fiber core 140 occupies as much internal space of the sheath 160 as possible. Each core unit 150 is preferably configured so that members other than the optical fiber core 140 occupy as little internal space of the sheath 160 as possible. By such adjustments, the spatial multiplicity can be further enhanced.

In addition, by providing a tension member 162 in the interior of the sheath 160 as shown in FIGS. 4A and 4B, influences such as elongation due to the tension of the optical fiber cable 100 and expansion and contraction due to temperature change can be reduced. It is also possible to increase formability by providing a press-wrapping on the outside of the core unit 150 so as to reduce the asperities on the inside of the sheath 160 caused by the bending of the optical fibers 130 in the core unit 150. To prevent water from entering the internal space of the sheath 160, a water absorbing material or a water stop material may be provided inside the sheath 160. Besides, it is possible to increase the strength of the sheath 160 of the optical fiber cable 100 in response to the requirements for the optical fiber cable 100, or to use, for the sheath 160, a material having high flame retardancy or a material that generates little toxic gas or smoke during combustion.

Fourth Embodiment

FIG. 5 is a schematic view of a core unit for explaining a fourth embodiment of the present invention. The present embodiment relates to another core unit 150A that can substitute for the core unit 150 shown in FIG. 2. FIG. 5 shows the appearance structure of the core unit 150A on the left side, and shows the cross-sectional structure of the core unit 150A on the right side. In FIG. 5, the members denoted by the same reference numerals as used in FIG. 2 are members similar to those of FIG. 2, and a detailed description of such members will be omitted.

As can be seen from the appearance structure shown on the left side of FIG. 5, the core unit 150A includes an optical fiber core 140, a bundle member 152 spirally wound around the outer periphery of the optical fiber core 140, and a binding bundle member 154 spirally wound around the outer periphery of the optical fiber core 140 and the bundle member 152. Although the core unit 150A is illustrated as having a single binding bundle member 154 in FIG. 5, the core unit 150A is not limited thereto and may have a plurality of binding bundle members 154.

That is, the core unit 150A according to the present embodiment has a configuration in which the binding bundle member 154 is further wound around the outer periphery of the core unit 150 according to the second embodiment.

Further, as can be seen from the cross-sectional structure shown on the right side of FIG. 5, a spiral radius Rb of the bundle member 152 is smaller than a radius Rf of the substantially circumscribed circle of the optical fiber core 140. A spiral radius Rk of the binding bundle member 154 is larger than the radius Rf of the substantially circumscribed circle of the optical fiber core 140.

In the optical fiber cable 100 including the core unit 150 according to the second embodiment, for example when the bundle member 152 is cut at an end portion or at an intermediate portion of the optical fiber cable 100 at the time of connection of the optical fiber cable 100, and the optical fiber core 140 becomes linear due to its own rigidity, the length of the bundle member 152 becomes shorter than the length of the optical fiber core 140 as shown in FIG. 6, and as a result, the bundle member 152 may come loose. In such a case, the bundled optical fiber core 140 may come apart.

In contrast, as shown in FIG. 5, the core unit 150A according to the present embodiment includes the binding bundle member 154 in addition to the bundle member 152. The binding bundle member 154 has a length equal to or longer than that of the optical fiber core 140. Thus, in the optical fiber cable 100 including the core unit 150A, even when the bundle member 152 is cut in order to connect the optical fiber cable 100 and the optical fiber core 140 becomes linear, the binding bundle member 154 remains wound around the outer periphery of the optical fiber core 140, as shown in FIG. 7. As a result, the core unit 150A is maintained in an integrated state. That is, the binding bundle member 154 serves to maintain the optical fiber core 140 in a bundled state. This improves the handleability of the optical fiber cable 100.

Fifth Embodiment

Figure 8:
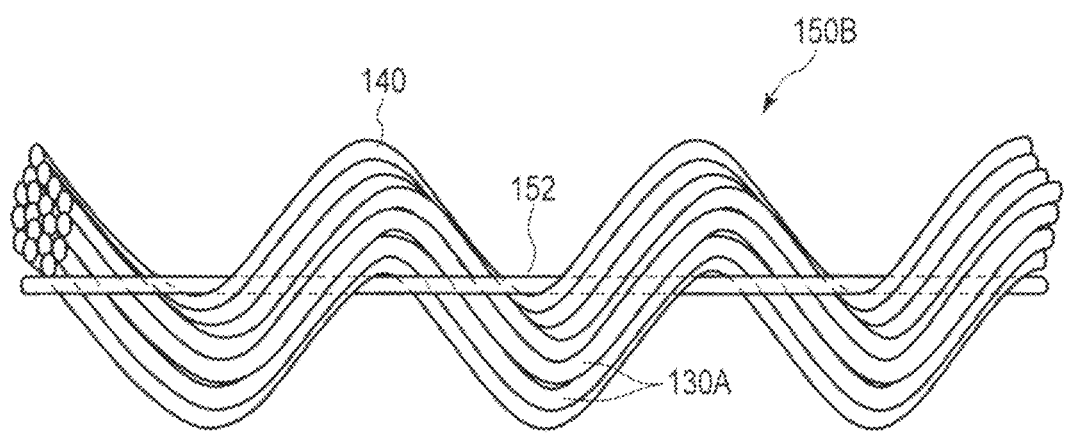
FIG. 8 is a schematic view of a unit for explaining a fifth embodiment of the present invention.

FIG. 8 is a schematic view of a core unit for explaining a fifth embodiment of the present invention. The present embodiment relates to another core unit 150B that can substitute for the core unit 150 shown in FIG. 2. In FIG. 8, the members denoted by the same reference numerals as used in FIG. 2 are members similar to those of FIG. 2, and a detailed description of such members will be omitted.

A general communication optical fiber 130A includes a glass optical fiber having an outer diameter of 125 μm, and a resin jacket provided concentrically on the outer periphery of the optical fiber and having an outer diameter of 250 μm. To form the core unit 150B by winding the bundle member 152 around the optical fiber core 140 including a plurality of communication optical fibers 130A as in the second embodiment, the winding needs to be performed while applying tension to the bundle member 152, for example. When tension is applied to the bundle member 152, a force to straighten the bundle member 152 is generated in the bundle member 152. As a result, bending occurs in the optical fiber core 140 around which the bundle member 152 is wound. Further, depending on its material, the bundle member 152 is elastically deformed by tension, which results in elongation of the bundle member 152.

Figure 9:
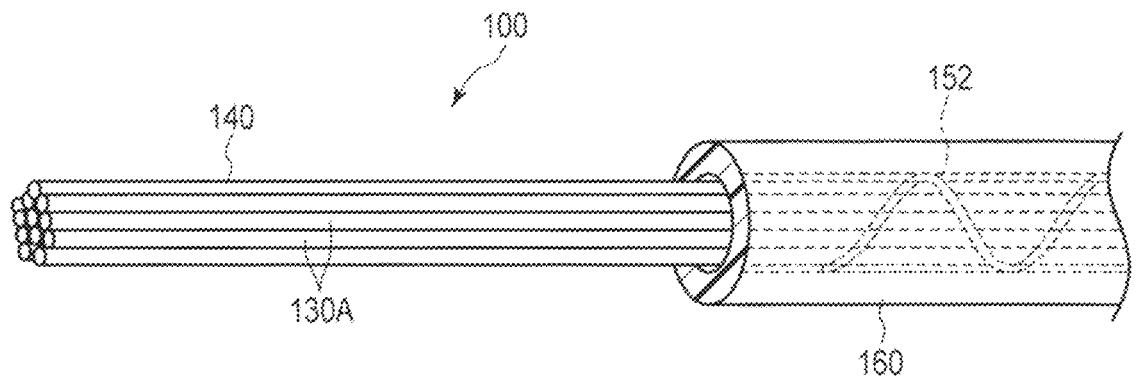
FIG. 9 is a schematic view of an optical fiber cable with a bundle member drawn into a sheath.

In the optical fiber cable 100 including such a core unit 150B, for example when the bundle member 152 is cut at the end portion or the intermediate portion of the optical fiber cable 100 at the time of connection of the optical fiber cable 100, tension being applied to the bundle member 152 is released, and thereby the bundle member 152, which had been elongated due to elastic deformation, may be shortened to its original state and drawn into the sheath 160 as shown in FIG. 9.

In the core unit 150B according to the present embodiment, the bundle member 152 is designed to have a bending rigidity higher than that of the optical fiber core 140 included in the core unit 150. With such a design, when the bundle member 152 is wound around the outer periphery of the optical fiber core 140, the bundle member 152 tends to be straight due to its own bending rigidity, and thereby bending is applied to the optical fiber core 140. Thus, the bundle member 152 can be wound around the optical fiber core 140 without applying tension to the bundle member 152. This prevents the bundle member 152 from being drawn into the sheath 160.

Also in the second embodiment, the bundle member 152 may be made of a material that has a high elongation rigidity and undergoes no or slight elastic deformation when tension is applied. Furthermore, it is also possible to prevent the bundle member 152 from being drawn into the sheath 160 by increasing the friction coefficient of the surface of the optical fiber core 140 or the inner surface of the sheath 160 that are in contact with the bundle member 152.

Sixth Embodiment

A sixth embodiment of the present invention relates to an optical fiber cable 100 including a plurality of core units 150. In the present embodiment, at least two of the core units 150 have bundle members 152 of different colors. For example, three or more of the core units 150 may have bundle members 152 of different colors. Also, all of the of the core units 150 may have bundle members 152 of different colors. With this configuration, the core units 150 can be identified based on the color of the bundle member.

Such a structure enables identifying the core units 150, as well as applying bending to the optical fiber core 140 and bundling the core units 150. Therefore, optical fibers can be more densely installed in the optical fiber cable 100 without separately using a structure for identifying the optical fibers in the optical fiber cable 100.

Seventh Embodiment

A seventh embodiment of the present invention relates to a detailed structure of a core unit 150. In the core unit 150 according to the present embodiment, the bundle member 152 is wound around the outer periphery of the core unit 150 at a pitch of 100 mm or less along the length direction of the core unit 150. To ensure handleability, the core unit 150 is desirably integrated with the bundle member 152.

The inventors of the present invention, therefore, conducted an experiment to confirm whether or not each of core units 150 around which the bundle member 152 is wound at different pitches can maintain the state in which the bundle member 152 is wound, when being taken out from the optical fiber cable 100. Table 1 shows results of the experiment. The evaluation results are indicated by "○" when the core unit 150 maintains the wound state, and by "x" when the core unit 150 fails to maintain the wound state and loses its integrity. The experimental results show that the handleability of the core unit 150 can be ensured when the pitch is 100 mm or less.

TABLE 1

| Winding pitch of bundle member | Evaluation result |
| --- | --- |
| 50 mm | ○ |
| 100 mm | ○ |

TABLE 1-continued

| Winding pitch of bundle member | Evaluation result |
|---|---|
| 200 mm | X |
| 300 mm | X |

Therefore, according to the present embodiment, bending can be applied to each of the optical fibers 130 of the optical fiber core 140 while ensuring the handleability of the core unit 150.

Eighth Embodiment

Figure 10:
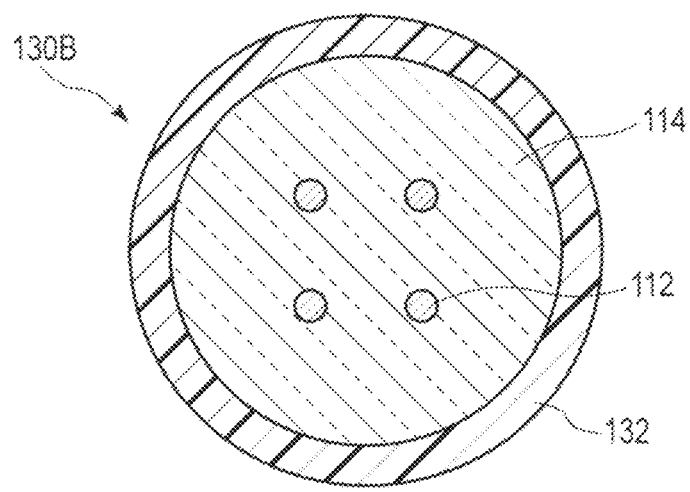
FIG. 10 is a schematic cross-sectional view of an optical fiber for explaining an eighth embodiment of the present invention.

FIG. 10 is a schematic cross-sectional view of an optical fiber for explaining an eighth embodiment of the present invention. The present embodiment relates to an optical fiber 130B that can substitute for the optical fiber 130 of the optical fiber core 140.

The optical fiber 130B according to the present embodiment is a multi-core optical fiber, and includes a plurality of cores 112, a clad 114 covering the periphery of the cores 112, and a jacket 132 covering the periphery of the clad 114. Thus, the optical fiber core 140 including the optical fiber 130B according to the present embodiment includes a multi-core optical fiber. The optical fiber 130B has, for example, four cores 112. The number of the cores 112 of the optical fiber 130B is not limited to four, and may be selected as appropriate.

In the optical fiber 130B, light propagating through each of the cores 112 is regarded as a single mode. The distance between the cores 112 may be less than 40 μm, for example. In this case, the number of the cores 112 per cross-sectional area can be larger than that of a non-coupled multi-core optical fiber.

Therefore, with the optical fiber core 140 including the optical fiber according to the present embodiment, the transmission capacity per optical fiber can be increased.

Ninth Embodiment

A ninth embodiment of the present invention relates to another optical fiber that can substitute for the optical fiber 130 of the optical fiber core 140. The optical fiber according to the present embodiment is a multi-mode optical fiber configured to propagate light in a plurality of modes. Thus, the optical fiber core 140 including the optical fiber according to the present embodiment includes a multi-mode optical fiber. The number of modes of the multi-mode optical fiber is not limited to a specific number, and may be selected as appropriate.

Therefore, with the optical fiber core 140 including the optical fiber according to the present embodiment, the transmission capacity per optical fiber can be increased as compared to the optical fiber core 140 including a single-mode optical fiber.

It should be noted that each core of the multi-core optical fiber may be a core capable of transmitting light in a plurality of modes.

According to the embodiments described above, bending according to the coupling characteristics of an optical fiber can be applied to the optical fiber, so as to achieve both improvement in spatial multiplicity and securing of coupling characteristics. In addition, it is possible to ensure workability, such as handleability and identifiability, of a core unit, which is required for an optical fiber cable. As a result, medium networks enabling a transmission with a small signal processing load at a receiver of a transmission apparatus can efficiently be established.

The present invention is not limited to the embodiments described above, and can be reduced in practice by modifying its structural elements in different ways without departing from the spirit of the invention. The embodiments may also be implemented by combining them as appropriate, in which case the combined advantages are obtained. Furthermore, the embodiments include inventions of various stages, and a variety of inventions can be derived by properly combining the structural elements disclosed in connection with the embodiments.

REFERENCE SIGNS LIST 100, 100A, 100B: Optical Fiber Cable
112: Core
114: Clad
130: Optical Fiber
130A: Communication Optical Fiber
130B: Optical Fiber
132: Jacket
140: Optical Fiber Core
150, 150A, 150B: Core Unit
152: Bundle Member
154: Binding Bundle Member
160: Sheath
162: Tension Member

The invention claimed is:

1. An optical fiber cable comprising:
   at least one optical fiber core including a plurality of optical fibers;
   a sheath containing the optical fiber core,
   a total length of the optical fiber core being longer than that of the sheath, the optical fiber core being contained in the sheath so that bending occurs in the optical fibers; and
   a bundle member spirally wound around an outer periphery of the optical fiber core, wherein the optical fiber core is bundled in a substantially circular shape in a cross section orthogonal to a cable axis, and wherein a spiral radius of the bundle member is smaller than a radius of a substantially circumscribed circle of the optical fiber core.

2. The optical fiber cable according to claim 1, wherein a minimum value of a bending radius of the optical fibers is a value equal to or larger than 15 mm, and a maximum value of the bending radius of the optical fibers is equal to or smaller than 200 mm.

3. The optical fiber cable according to claim 1, further comprising a binding bundle member spirally wound around an outer periphery of the optical fiber core and the bundle member,
   wherein a spiral radius of the binding bundle member is larger than the radius of the substantially circumscribed circle of the optical fiber core.

4. The optical fiber cable according to claim 1, wherein the bundle member has a bending rigidity higher than that of the optical fiber core.

5. The optical fiber cable according to claim 1, further comprising a plurality of core units each of which includes at least the optical fiber core and the bundle member, wherein at least two of the core units include bundle members of different colors from each other.

6. The optical fiber cable according to claim 5, wherein the bundle member is wound around an outer periphery of each of the core units at a pitch of 100 mm or less along a length direction of the core unit.

7. The optical fiber cable according to claim 1, wherein the optical fiber core includes a multi-core optical fiber having a plurality of cores.

8. The optical fiber cable according to claim 1, wherein the optical fiber core includes a multi-mode optical fiber configured to propagate light in a plurality of modes.

* * * * *